United States Patent

[11] 3,540,334

| [72] | Inventor | Thomas A. McLauchlan<br>Apt. 706, 2323 W. 2nd, Vancouver, British Columbia, Canada |
|---|---|---|
| [21] | Appl. No. | 781,124 |
| [22] | Filed | Dec. 4, 1968 |
| [45] | Patented | Nov. 17, 1970 |

[54] VIBRATION DAMPER FOR SAWS
19 Claims, 9 Drawing Figs.

[52] U.S. Cl. ................................... 83/13,
83/169, 83/201.15, 143/160
[51] Int. Cl. .................................... B26d 1/54
[50] Field of Search .......................... 83/13, 169,
201.15; 143/157—7, 158, 160, 164

[56] References Cited
UNITED STATES PATENTS
| 3,452,734 | 7/1969 | Cleland et al. | 83/201.15X |
| 3,465,794 | 9/1969 | McLauchlan et al. | 83/201.15X |
| 3,479,097 | 11/1969 | McLauchlan et al. | 83/201.15X |

*Primary Examiner*—William S. Lawson
*Attorney*—Buckhorn, Blore, Klarquist and Sparkman ABSTRACT: A vibration damping apparatus for thin power saw blades has a pair of guides disposed on either side of a saw blade and a porous material permeable by a liquid lubricant is disposed within each of the guides. A portion of the porous material in each guide is adjacent the saw blade, and a portion of the guide is disposed downstream of the porous material. Water or other liquid lubricant is delivered under pressure through the guide to the porous material and the portion of the porous material adjacent the saw blade applies a thin continuous, relatively uniform thickness film of the liquid to the surface of the saw blade to enable the downstream portion of the guide to ride friction-free on the film. The guides are thus able to stabilize and eliminate vibration from the saw blade and maintain the blade in the desired plane for cutting.

Patented Nov. 17, 1970
3,540,334
Sheet 1 of 2
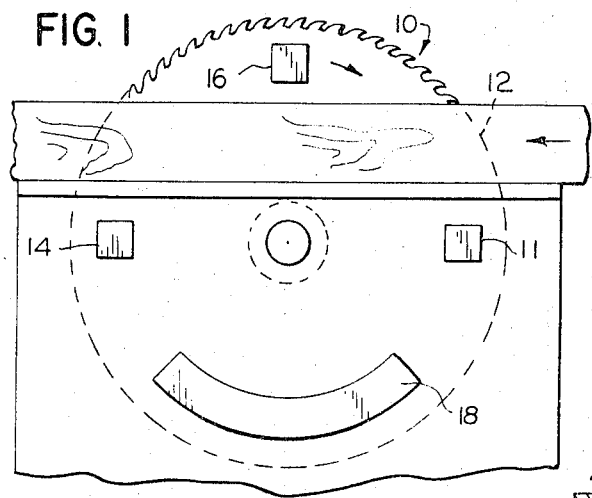
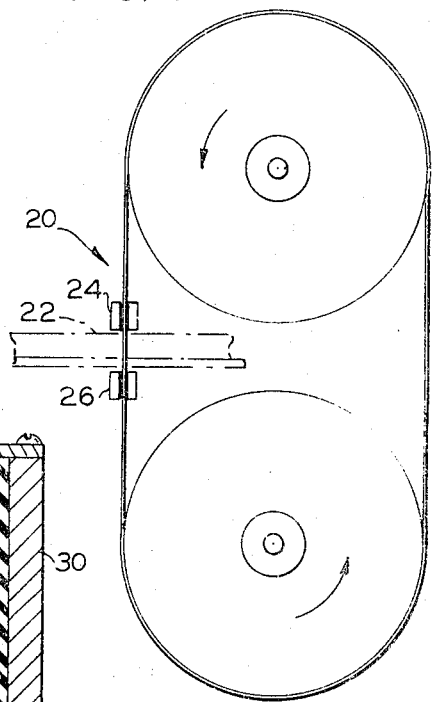
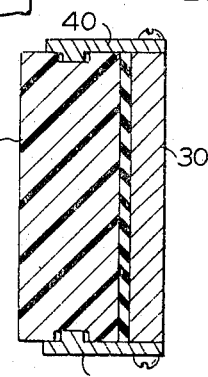
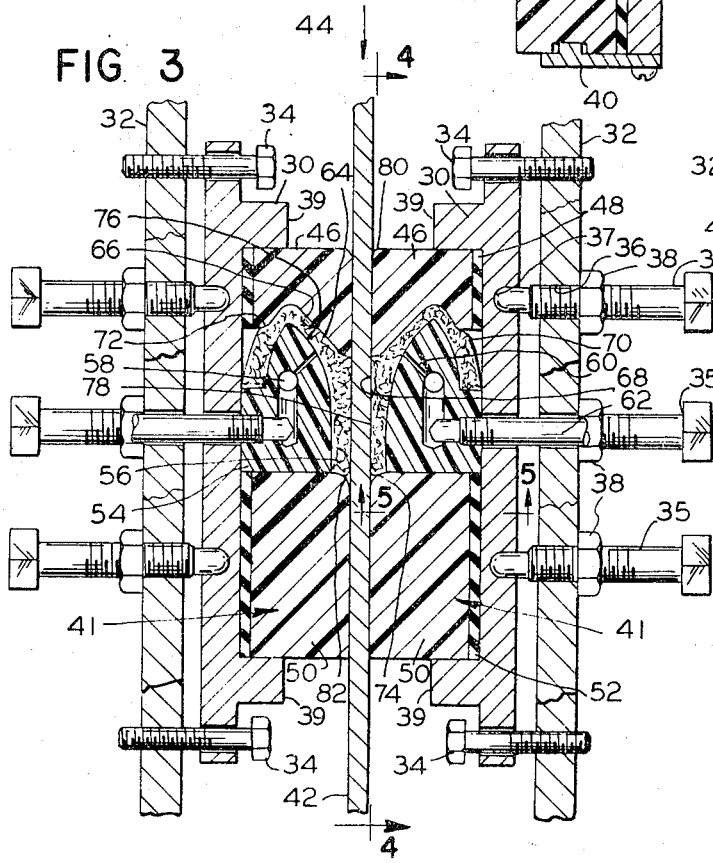
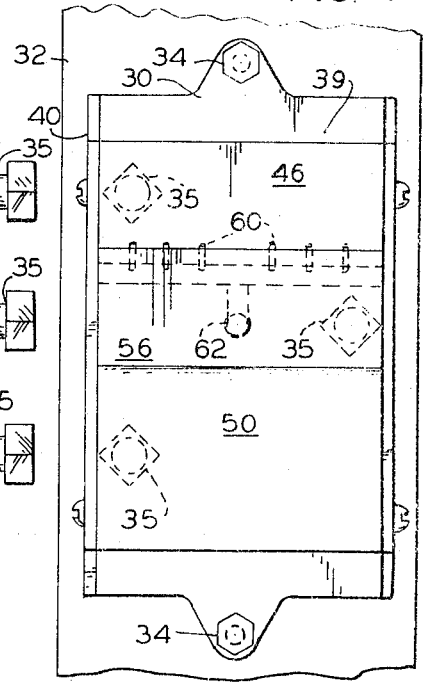
THOMAS A. McLAUCHLAN
*INVENTOR*
BY
BUCKHORN, BLORE, KLARQUIST & SPARKMAN
*ATTORNEYS*

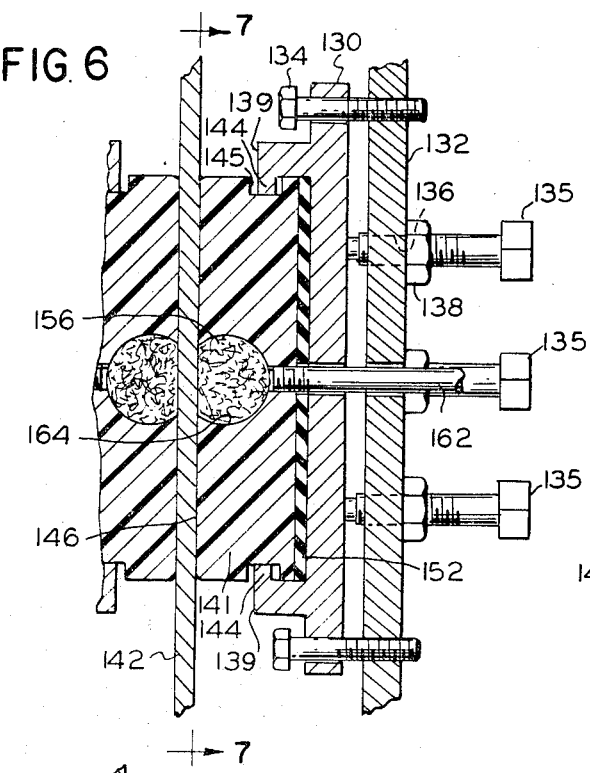
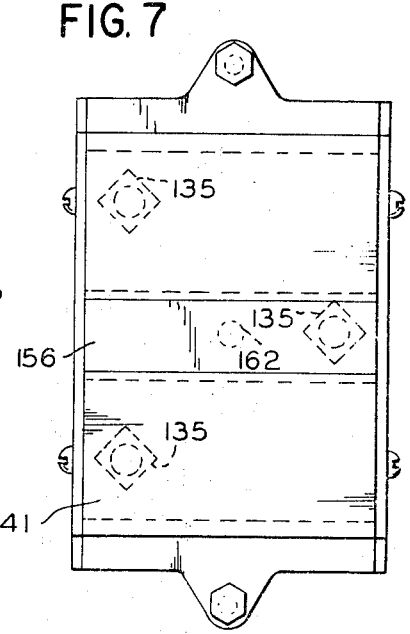
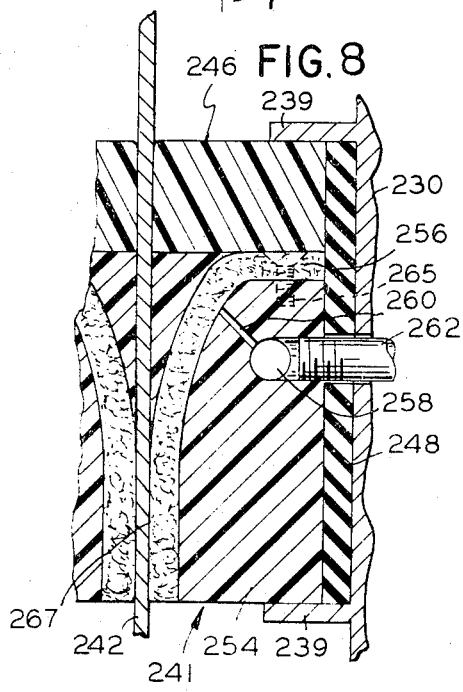
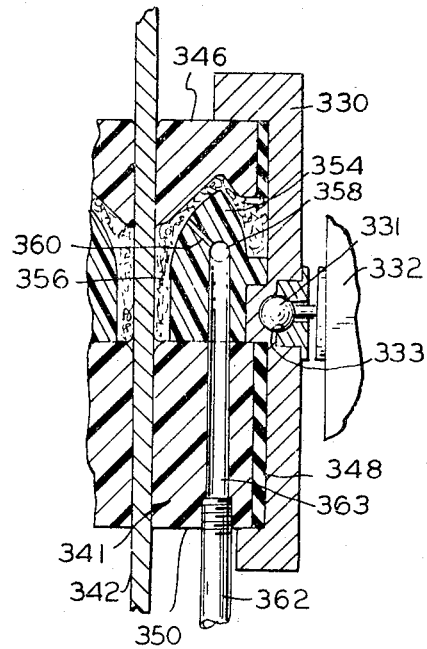
THOMAS A. McLAUCHLAN
INVENTOR
BY
BUCKHORN, BLORE, KLARQUIST & SPARKMAN
ATTORNEYS

3,540,334

VIBRATION DAMPER FOR SAWS

BACKGROUND OF THE INVENTION

This invention relates to an improved method and apparatus for damping vibrations in thin saw blades, and more particularly, to a method and apparatus wherein pressure is applied normal to the surface of the saw blade by guide or support means which ride substantially friction-free on a film of liquid lubricant applied to the blade.

Vibration is one of the biggest problems in sawing and there has been much work conducted on the analysis of vibrations in saws, especially band and circular type power saws wherein kerf reduction is of prime importance. With present day economics favoring the use of thinner saws to save kerf, many devices to damp vibration have been proposed and are currently in use, but for the most part wear is excessive and they are therefore somewhat ineffectual.

An effective combination of vibration dampers for either a circular or bandsaw permits the saw to retain the sawdust in the gullets more readily, which in turn reduces the necessity for the usual clearance between the saw plate and the wall of the cut or kerf. This together with the reduced vibration of the plate, which also permits the use of reduced clearance, permits the swage of the teeth to be reduced which also tends to achieve a narrower cut. Since the saw blade, and therefore the teeth, experience reduced vibration, the cut will also be smoother. The increase in stiffness in the saw blade afforded by the dampers permits the plate thickness to be reduced. Finally, dampers may also be useful in reducing saw wander, thus providing for an improved accuracy in sawing.

It is well known that the vibrations in a metal disk such as a circular saw plate can be reduced by restricting the lateral motion of the disk or plate at one or more points, preferably near the periphery thereof. If instead of restricting the lateral motion at discrete points such motion is restricted over somewhat larger areas, the reduction in vibration will be much more effective. The fact that the saw is in motion does not alter the damping technique except that the wear at the points or areas of contact must be kept within practical limits.

The elimination of vibration by the use of transverse support means placed adjacent the saw blade results in numerous advantages. Among these are the use of thinner saw bands and plates, the use of less swage on the teeth since with less vibration less clearance is required, and improved accuracy in cutting since the saw blade can be guided and held more accurately. Less power will also be required since less actual cutting is being performed and there is less friction between the plate and the work. Since the saw blade is subjected to less stress, a longer saw blade life can be obtained.

The use of guide or support blocks also makes it possible accurately to position the saw blade and makes it possible to use specially shaped teeth to obtain special effects such as extremely smooth rips or crosscuts. If the guide or support block is essentially nonwearing, it can be very accurately positioned. This is very important in the case of double cut saws such as pony saws.

SUMMARY OF THE INVENTION

Vibration damping is achieved according to the present invention by means which comprise a pair of guide or support means disposed on either side of a saw blade, the guide means having generally coextensive portions in opposed relation. Porous means permeable by a liquid lubricant are carried by each of the guide means. A portion of the porous means is disposed adjacent the saw blade, and a portion of the guide means is disposed downstream of the porous means.

Means are also provided to deliver a liquid lubricant (such as water) under pressure through the guide means to the porous means. The portion of the porous means adjacent the saw blade is thus enabled to apply a thin continuous, relatively uniform thickness film of liquid lubricant onto the surface of the saw blade, which in turn enables the downstream portion of the guide means to ride substantially friction free on the film.

The method of damping vibrations comprises delivering a liquid lubricant under pressure through a porous material in wiping relation with a moving saw blade to apply a thin continuous, relatively uniform thickness film of liquid lubricant onto a moving saw blade at a given location with respect to the work. A guide block or support is then placed in contact with the film downstream of this location. The guide block resists pressure of the saw blade in a direction normal to the surface of the saw blade to limit movement of the saw blade in such direction so that the block can stabilize the saw blade while riding substantially friction-free on the film of lubricant.

The invention takes advantage of the principle that with a proper liquid lubricant, it is possible to exert a force perpendicular to a surface moving relatively with respect to such force and achieve a substantially friction-free contact. Examples of this are the Hovercraft, a ski moving on snow, and the well-known phenomena of a tire moving at high speed on a wet roadway without (in that case) the safety of substantial friction contact therewith. The principle is effective as long as the relative velocity is sufficiently great. Excellent results have been obtained with relative speeds of approximately 60 miles per hour or greater between the object through which normal pressure is applied to the surface and the film on which such object rides.

In the present invention, a film of water or other liquid lubricant is wiped onto the moving saw blade as above described. A guide or stabilizer block is then placed in contact with the film on the blade downstream of the place of application of the film. The block rides substantially friction-free on the film on the saw in the same way that the tire of a speeding car rides on the film of water on the roadway (hydroplanes).

The method of applying the lubricating film is particularly important. The lubricant must not become fouled with sawdust or otherwise it may not effectively lubricate and protect the guides or stabilizer blocks so that they can function to dampen vibrations in the blade.

The film applicator includes an inner manifold in the guide means through which the liquid lubricant is fed by pressure to smaller ducts leading to the porous means and thence through the porous means to the region of the saw to be stabilized. A duct or conduit is provided to transport the liquid under pressure to the manifold. The liquid passes through the smaller ducts and into the porous means which wipes it onto the saw and delivers it as a thin continuous, relatively uniform thickness film on which the downstream portion of the guide means can ride substantially friction-free.

BRIEF DESCRIPTION OF THE DRAWINGS

FIG. 1 is a side elevational view of a circular saw blade showing areas where vibration damping means according to the present invention may be effectively placed.

FIG. 2 is a side elevational view of a band saw showing suitable locations for the placement of vibration damping means according to the present invention.

FIG. 3 is a cross-sectional view through one embodiment of vibration damping means according to the present invention.

FIG. 4 is a sectional view taken on line 4—4 of FIG. 3.

FIG. 5 is a top view of a portion of the apparatus shown in FIG. 3.

FIG. 6 is a cross-sectional view through another embodiment of the apparatus of the present invention.

FIG. 7 is a view taken on line 7—7 of FIG. 6.

FIG. 8 is a cross-sectional view of a further embodiment of the present invention.

FIG. 9 is a cross-sectional view through still another embodiment of the present invention.

DESCRIPTION OF THE PREFERRED EMBODIMENTS

FIG. 1 illustrates positions on a circular saw blade 10 at which vibration dampers according to the present invention are effective. The reference 11 indicates the simplest position which is immediately after the work, at which a vibration damper could be placed to be effective in stabilizing the cutting region 12 of the blade 10. A vibration damper at position 14 would be complementary. Vibration dampers at position 16 would be the most effective if they could be accommodated. Vibration dampers in the region marked with the numeral 18 would be helpful in certain cases.

FIG. 2 illustrates positions on a bandsaw 20 at which vibrations damping means according to the present invention are effectively placed. For a bandsaw, damping is required mainly above the work 22 and, to a minor extent, below the work. Damping means according to the present invention, however, could be used in both the upper area 24 and the lower area 26, as shown in FIG. 2. In some cases application of the film of liquid lubricant will only be required at the upper position 24 ahead of the damping blocks, but in other cases it will be required below the work too. Fouling of the damping system by sawdust can be a problem in the case of bandsaws. However in many cases the leading position of the damping device will protect the system from sawdust as well as providing the required damping.

A vibration damper according to the present invention is illustrated in detail in FIGS. 3—5. As shown, rigid adjustable metal brackets 30 are attached to a supporting structure 32 by bolts 34. The lateral position of brackets 30 is adjusted by means of three positioning and retaining bolts 35 which are screwed through threaded holes 36 in supporting structure 32. Bolts 35 bottom in recesses 37 in bracket 30 and when properly adjusted, are set with lock nuts 38. The use of three such bolts 35 permits two-directional transverse adjustment of the brackets 30.

The brackets 30 are each provided with upper and lower horizontally extending shoulder portions 39 and keyed end plates 40 (See FIG. 5) between which a pair of similar saw blade guides or supporting structures 41 are retained on either side of a saw blade 42. For the purposes of the following discussion, the blade 42 is assumed to travel in the direction of the arrow 44.

The supporting structures 41 have generally coextensive portions in opposed relation on opposite sides of saw blade 42. As illustrated in FIG. 3, each of the structures 41 comprises three members which may desirably be made of plastic, such as polyurethane, nylon, "Teflon" or plexiglass, or these structures may be of wood or metal. A lead stabilizing or damping block 46, which may be used for damping or for clearing sawdust or for both, is mounted on a piece of resilient sponge or foam rubber backing 48, and is urged into contact with blade 42 by pressure exerted by bracket 30. A trailing damping or stabilizing block 50 is mounted on a piece of sponge or foam rubber backing 52 and is similarly urged into contact with blade 42. An intermediate ducted water block 54, that conveys water under low pressure to a porous member 56 by means of a horizontally disposed internal manifold 58 and a plurality of uniformly spaced smaller ducts 60, is positioned between blocks 46 and 50. Manifold 58 is fed water under low pressure through a water line or conduit 62 which passes through supporting structure 32 and bracket 30 and is threaded into ducted block 54.

The porous members 56 extend the full width of the supporting structures 41. Water from conduit 62 is conveyed under low pressure to manifold 58 and from there to the small ducts 60 from which it is uniformly distributed across the full length of the porous member.

The porous members 56 are desirably made from a water permeable material through which water can flow and be distributed smoothly over the surface of the saw blade yet not be subjected to excessive wear. The material must be sufficiently stiff and have sufficient resiliency to remain in position adjacent the surface of the saw blade. A material such as a nylon mesh or the nonwoven nylon scrim sold by Minnesota Mining & Manufacturing Company under the trademark "Scotchbrite" and disclosed in U.S. Pat. No. 2,958,593 is suitable, but requires wetting or priming prior to use. The synthetic fiber indoor-outdoor carpeting (without backing) sold by Ozite Company under the trademark "Ozite" and made of a polymerized olefin is particularly suitable.

Each porous member 56 is shaped by the generally horizontally extending space 64 which exists between the upper surface of ducted block 54 and the lower surface of block 46. As illustrated in FIG. 3, this space 64 is of lesser transverse dimension in its middle region 66 than it is in either of its end regions 68 or 70. This special shape compresses or pinches the porous member 56 tightly in the middle, thereby to ensure that the water lubricant travels only toward the saw blade 42 and not outwardly therefrom. A shoulder 72 formed on the block 46 serves to hold the porous member 56 within the space 64 preventing it from being drawn out by its contact with the moving surface of the saw blade 42. The porous member 56 is also pinched tightly at its lower or downstream end 74 to eliminate leakage of water at the bottom and to remove excess film thickness on the saw blade 42 at that point. The porous member 56 is kept in contact with the curved inner surface 76 of ducted block 54 to prevent leakage of liquid past the porous member by pressure exerted by bracket 30.

The curved inner surface 76 of the ducted block 54 against which the porous member 56 rests is contoured so that the porous member is full of liquid and only very slightly compressed, if at all, at the region 78 where it contacts the moving saw blade 42, thereby to insure that the film of lubricant is applied. This is in contrast to the region 66 where the porous member 56 is pinched tightly to prohibit the flow of water away from the saw and at its lower end 74 where it is also pinched to eliminate leakage of water from the bottom and to remove excess film thickness on the saw.

In the case of circular saws, the film of water that is applied by the porous member 56 will generally stay on the plate throughout the complete cycle, and the low pressure in the porous member will not be critical. For bandsaws there may be no film remaining as the band approaches the damping structure at the upper position 24 and this low pressure in the porous member may be critical to minimize wear. In such case it may be desirable to have the lead damping block 46 retained in a fixed position rather than biased against the saw blade 42. In any event the ducted block 54 is not biased toward the saw blade in order to ensure that the porous member 56 is full of liquid and only very slightly compressed, if at all, over the area 78 exposed to the blade.

The structure is designed so that the trailing damping block 50, which is downstream of the porous member 56, is always in contact with the thin lubricating film on the surface of the moving saw blade 42 on which it can ride substantially friction-free. In certain cases the lead damping block 46 is also in contact with a lubricating film on surface of the saw so as to ride substantially friction-free thereon. The leading edges 80, 82 of the blocks 46 and 50, respectively, are slightly rounded or beveled to ensure that the film of water is not removed by contact with the blocks.

In practice, the supporting structure 41 is made approximately 2 inches long (in the direction of the arrow 44). Satisfactory operation is achieved when the rate of travel of the saw blade 42 with respect to the vibration damper is equal to or greater than 5,280 feet per minute (60 miles per hour) at which speed a film of water provides extremely good lubrication.

FIGS. 6 and 7 represent an alternative embodiment of a damping and guiding device according to the present invention. As shown, a pair of rigid adjustable mounting brackets 130 are attached to a supporting structure 132 by bolts 134. The lateral position of each bracket 130 is adjusted by means of three positioning and retaining bolts 135 which are screwed through threaded holes 136 in supporting structure 132. Bolts 135 exert lateral pressure against bracket 130 and when properly adjusted are set with lock nuts 138. The three bolts 135 permit two-directional transverse adjustment of the bracket 130.

The brackets 130 are each provided with upper and lower horizontally extending shoulder portions 139 between which a block 141 is retained for damping vibrations and guiding a saw blade 142. The shoulder portions 139 are each provided with inwardly extending lips 144 received in slots 145 in block 141 to restrain the same from movement in the transverse direction.

The damping device shown in FIGS. 6 and 7 is particularly suitable for use with bandsaws, and as such, the damping and guiding blocks 141 have generally coextensive portions in opposed relation on opposite sides of the blade 142. In this embodiment, the blocks 141 are each made of one unitary plastic piece.

Water under low pressure is fed through a conduit 162 which passes through structure 132 and bracket 130 and is threaded into block 141. A porous permeable pad member 156 is positioned centrally within block 141 and extends horizontally the full width thereof. Block 141 is mounted on a piece of sponge of foam rubber backing 152 against which transverse pressure is exerted by bracket 130. Water from conduit 162 is conveyed to the porous member 156 from which it is applied to the surface of the saw blade 142.

The porous member 156 is kept adjacent the surface of the blade 142 by pressure exerted through the rubber backing 152 by the bracket 130. The porous member 156 is retained within the block 141 by the special shape of the opening 164. This shape is generally cylindrical with its axis being perpendicular to the line of motion of the saw blade and acts to hold the porous member 156 within the block 141 and prevent it from being dragged out by its contact with the moving surface of the saw blade. In accordance with the invention, a portion 146 of the block 141 is disposed downstream of the porous member 156, and this portion rides substantially friction-free on the thin continuous, relatively uniform thickness film of liquid lubricant that is wiped onto the surface of the saw blade 142 by the porous member.

FIG. 8 represents still another embodiment of the present invention. As shown, a fixed metal mounting bracket 230 provided with upper and lower horizontally extending shoulder portions 239 supports a pair of guide or supporting structures 241 on either side of a saw blade 242. The supporting structures 241 have generally coextensive portions in opposed relation on opposite sides of the saw blade.

As illustrated in FIG. 8, each of the structures 241 comprises two members, each of which may desirably be made of plastic, such as polyurethane, nylon or "Teflon". A lead stabilizing or damping block 246, which may be used for damping vibrations in the blade 242 or for clearing sawdust or for both, and a trailing ducted block 254 are mounted inwardly of a piece of sponge or foam rubber backing 248 to be urged into contact with blade 242 by pressure exerted by bracket 230.

A porous member 256, in the form of a porous permeable, solidly packed mat that acts as both a liquid applicator and saw guide, is received within block 254. Water under low pressure from a conduit 262 is fed into a manifold 258 and thence through a plurality of uniformly spaced smaller ducts 260 from which it is uniformly distributed across the full width of porous member 256. A plurality of flush-head screws 265 retain the porous member 260 within the structure 241, preventing it from being dragged out by its contact with the moving surface of the saw blade 242. The synthetic fiber indoor-outdoor carpeting (without backing) sold by the Ozite Company under the trademark "Ozite" is particularly suitable for the porous permeable member 256 of the FIG. 8 embodiment. Such a material is sufficiently hard, fine and porous effectively to wipe force-fed lubricating fluid on the surface of the saw blade on which the block 246 can ride substantially friction-free. It will be noted that in this embodiment it is the downstream portion 267 of the porous member 256 (which is a part of the guide structure 241) that rides substantially friction-free on the film of liquid lubricant to stabilize the saw blade.

FIG. 9 illustrates still another embodiment of a saw blade vibration damping device according to the present invention. As shown, a rigid adjustable metal bracket 330 retaining a saw blade guide or supporting structure 341 exerts transverse pressure against a saw blade 342. A ball 331 attached to a supporting structure 332 is received in a socket 333 attached to the bracket 330, and exerts pressure against the supporting structure 341 through a piece of sponge or foam rubber backing 348.

As in the embodiment shown in FIGS. 3—5, each of the supporting structures 341 have generally coextensive portions in opposed relation on opposite sides of the saw blade 342. Each of the structures 341 comprises three members, a load stabilizing or damping block 346, a trailing damping or stabilizing block 350, and an intermediate block 354. A conduit 362 for low pressure water is threaded into a block 350, thus bringing the water into the structure 341 from the bottom. A duct 363 passing through both blocks 350 and 354 leads to a horizontally disposed internal manifold 358 in block 354 from which the water is distributed through a plurality of uniformly spaced smaller ducts 360 to a porous member 356.

FIG. 9 illustrates how at least one of a pair of supporting structures 341 can be positioned in a swivel manner by a universal type joint so that the center of the guide is positioned at a predetermined point in the transverse or horizontal position corresponding to the precise point required by the saw for accurate cutting, but leaving the damping device free to seat itself as required.

A liquid lubricant suitable for the present invention is water as previously mentioned, but other liquids may be used. The pressure at which it is introduced is relatively low. The preferred pressure ranges from 5 to 14 inches of water, but, if necessary to provide the required flow of lubricant, this pressure may be increased. The required flow is approximately 1 to 1½ gallons per hour for a porous member which is 3 inches in width.

Also the resilient foam or sponge rubber backings for the guide blocks shown in the various modifications are advantageous, particularly in that they render initial adjustments of the guides less critical, but the vibration dampers of the present invention are operable without these resilient backings, if correctly adjusted.

In the foregoing description the invention has been described with reference to certain particular preferred embodiments, although it is to be understood that the specific details shown are merely illustrative and that the invention can be carried out in other ways without departing from the true spirit and scope of the following appended claims.

I claim:

1. Vibration damping means for a power saw blade comprising a pair of guide means disposed on either side of a saw blade, said guide means having generally coextensive portions in opposed relation;

porous means permeable by a liquid lubricant carried by each of said guide means, a portion of said porous means being disposed adjacent and in wiping relation with said saw blade, a portion of said guide means being disposed downstream of said porous means; and means to deliver a liquid lubricant under pressure through said guide means to said porous means to apply a thin continuous, relatively uniform thickness film of said lubricant to the surface of said saw blade from said portion of said porous means adjacent said saw blade to enable said downstream portion of said guide means to ride substantially friction-free on said film on said saw blade.

2. The vibration damping means of claim 1 in which said guide means comprise a leading stabilizing block, a trailing stabilizing block, and an intermediate block positioned between said leading and said trailing stabilizing blocks, said porous means being carried between said leading and said intermediate blocks, at least said trailing block riding substantially friction-free on said film of lubricant.

3. The vibration damping means of claim 2 further comprising a supporting structure, a bracket attached to said supporting structure on each side of said saw blade, said leading, trailing and intermediate blocks being retained by said brackets adjacent said saw blade, and a resilient member retained between said brackets and each of said leading and trailing blocks to urge the latter into contact with said film by pressure exerted by said brackets.

4. The vibration damping means of claim 2, in which said lubricant delivering means comprise a conduit attached to a source of liquid lubricant under pressure, said conduit being attached to said intermediate block, a horizontally extending manifold disposed within said intermediate block and in communication with said conduit, and a plurality of ducts in communication with said manifold and adapted to distribute said lubricant to said porous means uniformly across the length thereof.

5. The vibration damping means of claim 2, in which said porous means is compressed within a portion of the space between said leading and said intermediate blocks to direct the flow of lubricant along said porous means only in the direction of said saw blade.

6. The vibration damping means of claim 2 further comprising a shoulder mounted on said loading block to prevent said porous means from being drawn out by its contact with said saw blade.

7. The vibration damping means of claim 2, in which said porous means is pinched tightly at its downstream end to prevent leakage of lubricant therefrom.

8. The vibration damping means of claim 1, in which said porous means comprises a nylon mesh.

9. The vibration damping means of claim 1, in which said porous means comprises a nonwoven nylon scrim.

10. The vibration damping means of claim 1, in which said guide means comprises a unitary member, said porous means being positioned centrally of said member and extending horizontally thereof.

11. The vibration damping means of claim 10, in which said porous means is generally cylindrically shaped.

12. The vibration damping means of claim 1, in which said guide means comprises a leading stabilizing block and a trailing stabilizing block, said porous means being disposed between said leading and trailing stabilizing blocks.

13. The vibration damping means of claim 12, in which said porous means has a downstream portion, said downstream portion of said porous means riding substantially friction-free on said film of lubricant to stabilize said saw.

14. A method of damping vibrations in a power saw blade comprising:
delivering a liquid lubricant under pressure through a porous material in wiping relation with a moving saw blade to apply a thin continuous, relatively uniform thickness film of liquid lubricant onto the moving saw blade at a given location with respect to the work;
contacting said film downstream of said location with a guide element; and
applying pressure to said guide element normal to the surface of said saw blade to stabilize said saw blade by said element while said element is riding substantially friction-free on said film of lubricant.

15. The method of claim 14 in which said liquid lubricant is delivered under pressure.

16. The method of claim 14 in which said liquid lubricant is water.

17. The method of claim 16 in which said water is applied to said saw blade at a rate of between approximately 1 and 1½ gallons per hour.

18. The method of claim 16 in which said saw blade is moving with respect to said guide block at a speed of at least 60 miles per hour.

19. The method of claim 16 in which said water is delivered under a pressure of between 5 and 14 inches of water.